April 23, 1968 T. V. BENTSEN 3,379,207
SAFETY VALVE
Filed Feb. 5, 1965

INVENTOR
Thomas V. BENTSEN
BY
ATTORNEYS

United States Patent Office 3,379,207
Patented Apr. 23, 1968

3,379,207
SAFETY VALVE
Thomas Valdemar Bentsen, Aarhus, Denmark, assignor to Jydsk Varmekedelfabrik A/S, Brabrand, Denmark
Filed Feb. 5, 1965, Ser. No. 430,518
Claims priority, application Denmark, Feb. 14, 1964, 713/64
3 Claims. (Cl. 137—251)

ABSTRACT OF THE DISCLOSURE

A pressure relief valve formed of a valve housing with a stop member against which a valve member disposed within the valve housing can abut in such manner that the said valve member is maintained at a small distance from the parts of the valve housing surrounding the valve member. The lower end of valve housing includes mercury to provide a seal between the valve member and the valve housing and to partly carry the valve member. A pressure inlet chamber is provided around the lower end of the valve member and valve housing, said chamber having an inlet for admitting a pressurized medium and having an upturned portion acting as said stop member for the lower end of the valve member. The valve member being substantially conical and having a relatively large diameter head portion remote from said stop member or of stepped longitudinal cross-section decreasing in diameter towards said stop member.

---

This invention relates to a safety valve of the type comprising a loaded valve body and a seat for the same.

On account of the load on it and also because of the pressure it exerts for a longer period against its seat, the valve body of such safety valves may get stuck to the seat so that it is necessary to have a greater pressure than was meant for the lifting of the valve body from its seat. The valve does not then operate as it was designed to do. It is also difficult to obtain absolute tightness between the valve bodies of such valves and its seat.

The object of the invention is to provide a safety valve of a similar type which is always and in a simple manner, without any difficulty, absolutely tight when required, and the valve body of which cannot stick to its seat but may be freely rotatable even when the valve is closed.

According to the invention, this is obtained by means of a pressure relief valve comprising a valve disposed within a valve housing and arranged to abut against a stop member in the closed condition of the valve in such a manner that the valve member is maintained at a small distance from the parts of the valve housing surrounding the valve member sufficient to prevent sticking between the member and housing, and which includes mercury in the lower end of the valve housing providing a valve seal between the valve member and valve housing in the closed condition of the valve and arranged to relieve excess pressure applied to the valve by being forced up through the space between the valve member and the valve housing and causing relative displacement therebetween to permit the excess pressure to be vented through the increased cross-section space provided between the valve member and valve housing.

Figure 1:
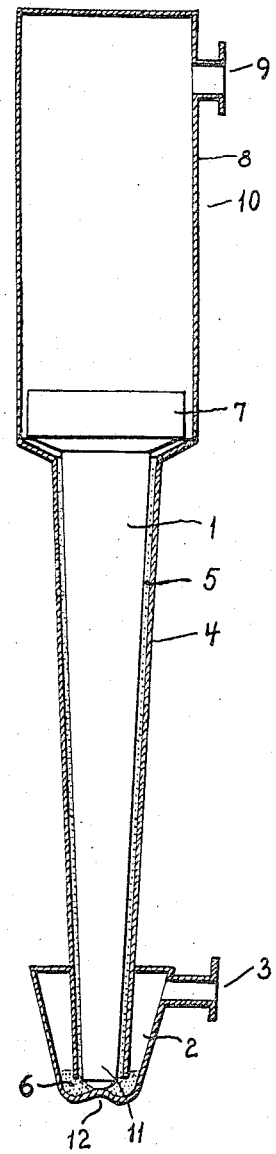
Figure 2:
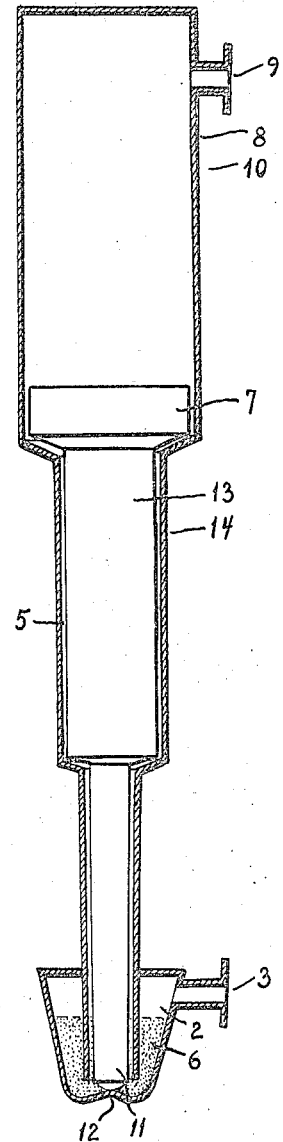

The invention is described in detail below with reference to the drawing, in which FIG. 1 illustrates one embodiment of the safety valve according to the invention, viewed partly in vertical longitudinal section, and FIG. 2 illustrates another embodiment of the safety valve, viewed partly in vertical longitudinal section.

The embodiment shown in FIG. 1 has a valve housing 10 substantially fitting around a valve body comprising a tall slender cone 1 having a thin end 11 facing downwards and a broader heavy head 7. The end 11 rests on an abutment or a part 12 at the bottom of a supply chamber 2 having an inlet opening 3 adjacent the bottom of the valve housing 10. The latter has a tall slender seat 4 in the form of a conical tube surrounding the cone 1 and generally having the same angle at its top as the latter.

In the small space 5, of one to twenty mm., between the cone 1 and the seat 2, there is a preferably heavy liquid, such as mercury, having the desirable qualities. Excess pressure through the opening 3, e.g. steam pressure from a hot water boiler (not shown) or a heating unit to which the valve is particularly applicable, will force the mercury 6 from the chamber 2 up into the space 5, in which it thus forms a seal.

In the case of a predetermined pressure rise through the opening 3, the mercury 6 may rise up to under the lower face of the heavy head 7, and on account of the selected dimensions two things will happen. The cone 1 will float on the mercury and consequently rise a little. Simultaneously the mercury 6 will move down into chamber 2 and up into the conical tube 4 and possibly into the tubular part 8.

If now the pressure does not decrease, the cone 1 will as a consequence of the pressure acting on the said lower face, rise still further, and this movement will be strongly supported by the fact there is now both static and dynamic pressure on the lower face of the head 7 which has a rather large area. The cone 1 and the head 7 will now float up into the tubular part 8 of the valve housing 10 surrounding the head 7 with a suitable tolerance, and will disclose a hole in a branch pipe 9 for a blowing out into the open air from the valve housing. There may be several holes in branch pipes 9.

During the lifting operation a sufficiently free space has appeared between the cone 1 and the seat 4 and between the head 7 and the tubular part or the casing 8 for obtaining the desired flowing out capacity.

When the pressure has fallen to somewhat below normal, the valve body 1, 7 will return to the illustrated start position, just as the mercury 6 will again try to find its way down into the space 5.

In the embodiment shown in FIG. 2 there is, instead of a cone, a stepped part 13, and the seat 14 of the valve housing is similarly constructed. This will give a cheaper construction than the one shown in FIG. 1. There may be more steps than shown in the embodiment in FIG. 2.

For practical reasons the valve must be provided with cyclone filters at its inlet and outlet with a view to the separation of impurities and mercury drops respectively.

I claim:
1. A pressure relief valve comprising:
   (a) a vertical valve housing having a lower open end;
   (b) means defining a chamber for a pressure fluid to be relieved, said chamber surrounding said lower open end;
   (c) a valve body in said housing generally having the shape of said housing;
   (d) a stop member, for the lower end of said body, formed at the bottom of said chamber and constructed to cause the formation of a space between said housing and body when the lower end of said body rests thereon;
   (e) a bath of mercury surrounding said lower ends of said housing and body, and
   (f) pressure fluid inlet means to said chamber above said bath, whereby when the pressure of said fluid rises, the mercury flows from said chamber into said space.

2. A valve as claimed in claim 1 wherein said housing and valve body have the shape of inverted cones and said body is formed with an enlarged head at the top thereof.

3. A valve according to claim 1 wherein said housing and valve body are of corresponding stepped longitudinal cross-section decreasing in diameter towards said stop member.

References Cited

UNITED STATES PATENTS

| | | | |
|---|---|---|---|
| 1,977,039 | 10/1934 | Brouse | 137—533.17 X |
| 245,011 | 8/1881 | Nicholson | 137—251 |
| 2,693,198 | 11/1954 | Heath | 137—251 |
| 2,719,537 | 10/1955 | Gildersleeve | 137—251 |

WILLIAM F. O'DEA, *Primary Examiner.*

D. LAMBERT, *Assistant Examiner.*